(12) United States Patent
DuBois (10) Patent No.: US 7,370,432 B2
(45) Date of Patent: May 13, 2008

(54) TAPE MEASURE WITH DETACHABLE TAPE (76) Inventor: R. Clark DuBois, 49 Bullivant Farm Rd., Marion, MA (US) 02738

( * ) Notice: Subject to any disclaimer, the term of this patent is extended or adjusted under 35 U.S.C. 154(b) by 0 days.

(21) Appl. No.: 11/515,891

(22) Filed: Sep. 6, 2006

(65) Prior Publication Data
US 2007/0051006 A1 Mar. 8, 2007

Related U.S. Application Data (60) Provisional application No. 60/715,785, filed on Sep. 8, 2005.

(51) Int. Cl.
G01B 3/10 (2006.01)
(52) U.S. Cl. .............................. 33/761; 33/767; 33/769
(58) Field of Classification Search ................. 33/755, 33/759, 761, 764, 766, 767, 768, 769, 771; D10/72
See application file for complete search history.

(56) References Cited

U.S. PATENT DOCUMENTS

| | | | | |
|---|---|---|---|---|
| 1,986,551 A | * | 1/1935 | Anderson | 33/769 |
| 1,988,428 A | * | 1/1935 | Carlson | 33/761 |
| 2,011,081 A | * | 8/1935 | Ritter | 33/768 |
| 2,014,375 A | * | 9/1935 | Carlson | 33/767 |
| 2,036,720 A | * | 4/1936 | Ritter | 33/768 |
| 2,048,969 A | * | 7/1936 | Ritter | 33/768 |
| 2,072,538 A | * | 3/1937 | Vols | 33/767 |
| 2,131,694 A | * | 9/1938 | Stowell | 33/767 |
| 2,158,024 A | * | 5/1939 | Stowell | 33/767 |
| 2,184,448 A | * | 12/1939 | Witchger | 33/767 |
| 2,230,668 A | * | 2/1941 | Ohrtmann | 33/764 |
| 3,356,311 A | * | 12/1967 | Winkler et al. | 242/348.1 |
| 3,718,301 A | * | 2/1973 | Morton | 242/343.2 |
| 3,774,309 A | * | 11/1973 | Leopoldi | 33/769 |
| 4,077,128 A | * | 3/1978 | Stoutenberg | 33/769 |
| 4,155,168 A | | 5/1979 | DuBois | 33/32.5 |
| 4,434,652 A | | 3/1984 | Christie | |
| 4,972,601 A | | 11/1990 | Bickford et al. | 33/770 |
| 6,243,964 B1 | | 6/2001 | Murray | |
| 6,249,986 B1 | | 6/2001 | Murray | |
| 6,282,808 B1 | | 9/2001 | Murray | |
| 6,324,769 B1 | | 12/2001 | Murray | |
| 6,367,161 B1 | | 4/2002 | Murray et al. | |
| 6,449,866 B1 | | 9/2002 | Murray | |
| D466,035 S | * | 11/2002 | Odachowski | D10/72 |
| 6,643,947 B2 | | 11/2003 | Murray | |
| 6,804,899 B2 | | 10/2004 | Murray | |
| 6,892,468 B2 | | 5/2005 | Murray et al. | |

* cited by examiner

Primary Examiner—R. Alexander Smith
(74) Attorney, Agent, or Firm—Young & Thompson (57) ABSTRACT A tape measure includes a case with an opening, a core inside the case, a spring extending around and imparting a radially inward force to most of a circumference of the core, and a graduated free metal tape with an arcuate cross-section that is wound around the core between the core and spring. The free metal tape is not connected to the case and core and its entire length is passable through the opening. The spring urges the tape flat against the core. The tape may be graduated on both sides. The case may include rollers that roll on an external periphery of the tape wound around the core and that are urged radially inward by the spring, and plural slots in which respective axes of the rollers are displaced in response to a change of diameter of the external periphery of the tape wound around the core.

21 Claims, 10 Drawing Sheets

TAPE MEASURE WITH DETACHABLE TAPE

BACKGROUND OF THE INVENTION

The present invention is directed to a tape measure with a resiliently deformable tape that is coiled inside a case and retractable from the case for use.

There are many tape measures on the market, including the tape measure described in the present applicant's U.S. Pat. No. 4,155,168. Most tape measures feature automatic tape retraction and include a power spring to wind up the tape. A tape lock holds the tape in an extended position. The radially interior end of the coiled tape is attached to the case so that the tape cannot be removed from the case in normal use. This is a problem when a measuring tape that is free of the case is preferred.

The tape is typically made of a resiliently deformable material, such as spring metal or suitable plastic, with an arcuate cross section to give the tape stiffness. "Stand-out" is the distance from its case that a tape can extend straight and depends on the tape cross section and width. A greater "stand-out" than currently available is desired.

The tape includes graduations on a top surface as the tape comes out of the case, which in use is the concave side of the tape. Due to the concave shape, the graduations are often hard to see and the graduations are separated from the working surface.

SUMMARY OF THE INVENTION

An object of the present invention is to provide a novel tape measure that avoids the problems of the prior art. The tape measure includes a case, a resiliently deformable coiled tape inside the case that is free of connections to the case, and a flexible tension device that is attached to the case and that extends around and imparts a radially inward force to a majority of an external periphery of the coiled tape.

A further object of the present invention is to provide a novel tape measure that includes a case with an opening, a core inside the case, a spring extending around and imparting a radially inward force to most of a circumference of the core, and a graduated free metal tape with an arcuate cross-section that is wound around the core between the core and spring, where the free metal tape is not connected to the case and core and its entire length is passable through the opening, and where the spring urges the tape flat against the core.

In addition, the tape may be graduated on both sides. Further, the case may include rollers that roll on an external periphery of the tape wound around the core and that are urged radially inward by the spring, and plural slots in which respective axes of the rollers are displaced in response to a change of diameter of the external periphery of the tape wound around the core.

These and other objects and advantages of the invention will be apparent to those of skill in the art of the present invention after consideration of the following drawings and description of preferred embodiments.

DESCRIPTION OF PREFERRED EMBODIMENTS

Figure 1:
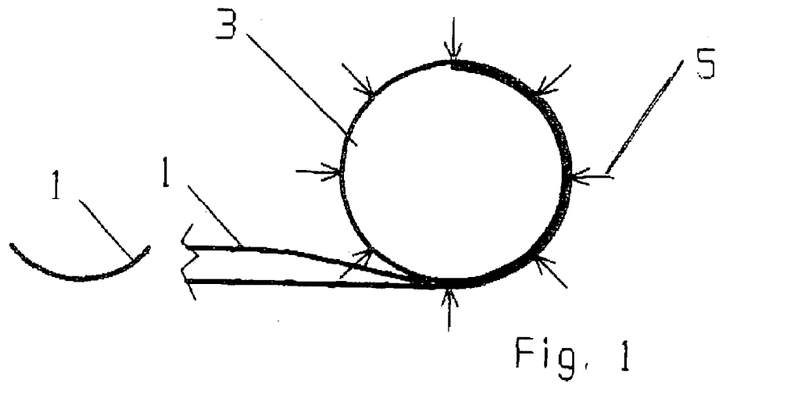
FIG. 1 is a schematic side view illustrating a principle of operation of the present invention.

With reference now to FIG. 1 that illustrates a principle of operation of the present invention, a tape 1 that extends tangentially from a core 3 is wound around the core (coiled) by radially inward forces 5. The tape will hold its free shape, straight and with arcuate cross section, unless forced to coil around core 3 by forces 5. As tape 1 is wound around the core, the coil formed by tape 1 grows radially outward, and the place of application of forces 5 must also move radially outward a corresponding distance. It is not practical to force the tape into a coil by fixed rollers or other fixed means that have a fixed circle of application of forces 5, even if the core is compliant because, with a fixed outside diameter, as more tape is fed to the coil the inside diameter must decrease. In this event, the tape-to-tape friction will increase rapidly and stop tape movement after a few turns. Thus, the place of application of forces 5 on the outside of the coil must move radially outward with the expanding tape coil. The present invention achieves this by providing a flexible tension device that extends around and imparts a radially inward force to a majority of a radially external periphery of the coiled tape. The flexible tension device expands radially outward as the size of the coil increases.

Figure 2:
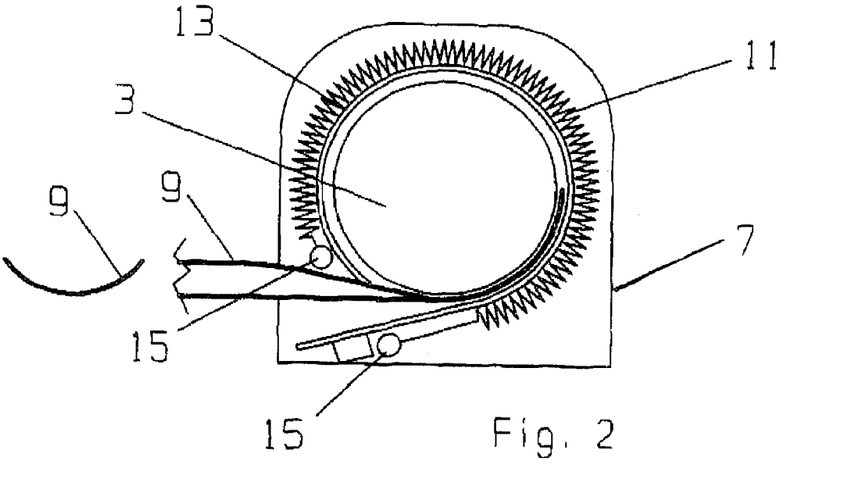
FIG. 2 is a cut-away side view showing a first embodiment of the present invention.

FIG. 2 shows a first embodiment of the tape measure of the present invention that includes a case 7, a resiliently deformable coiled tape 9 inside case 7 that is free of connections to any part of the tape measure, and a flexible tension device 11 whose ends are attached to case 7 and that extends around and imparts a radially inward force to a majority of a radially external periphery of tape 9. Tape 9 may be arcuate and made of resiliently deformable material, such as spring metal or suitable plastic. A low friction strip 13 (for example, a plastic band) may be provided between flexible tension device 11 and the external periphery of tape 9 to facilitate withdrawal and replacement of the tape. Flexible tension device 11 preferably is of a type that provides a relatively constant tension force as it expands and may be a tension (or garter) spring or a non-metallic elastic device. Ends of flexible tension device 111 may be attached to posts 15 that extend from an inside of case 7. This embodiment may be suitable for shorter tapes, depending on the friction of low friction strip 13. In any event, the tape is not attached in any way and can come free of the case and is useful as a free tape. It can be easily pushed back into the case and recoiled.

Figure 3A:
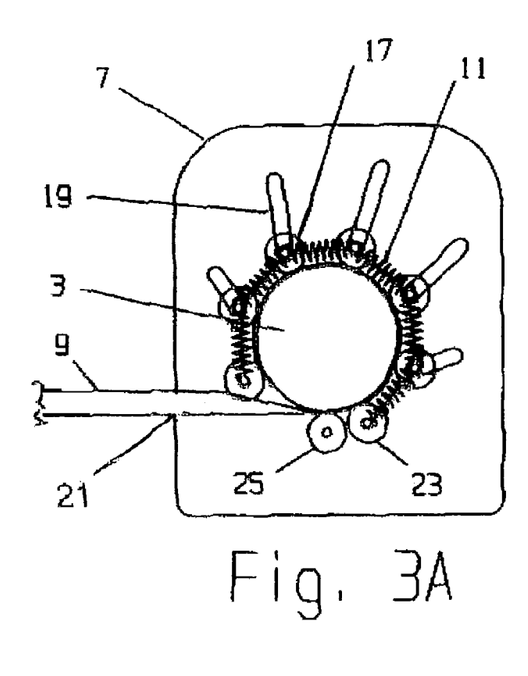
FIGS. 3A-C are views of a second embodiment of the present invention.
Figure 3B:
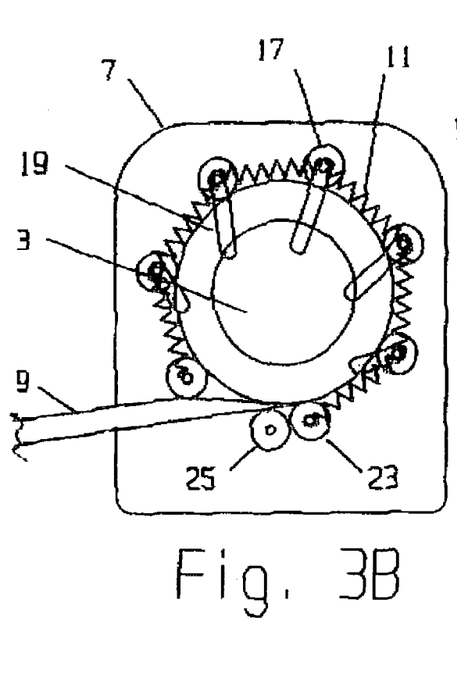
Figure 3C:
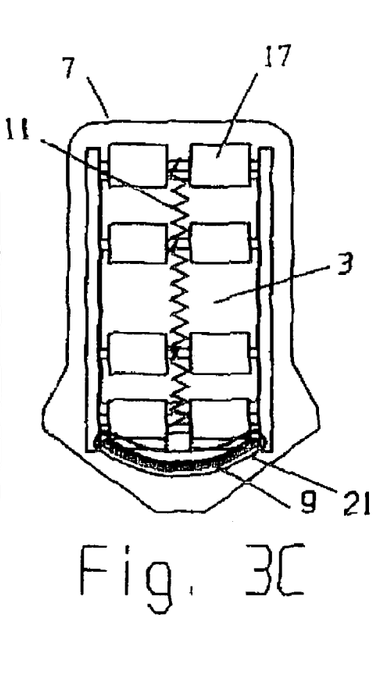

FIGS. 3A-C show a second embodiment that uses rollers to further reduce the friction. Plural spaced apart first rollers 17 roll on the external periphery of tape 9 and are urged radially inward by flexible tension device 11. Case 7 may include plural slots 19 in an inside surface of case 7 and in which respective axles of first rollers 17 are displaced in response to a change in diameter of the external periphery of tape 9. Slots 19 may be angled as shown to provide suitable positions for the first rollers as the diameter of the coil of tape 9 increases. Alternatively, slots 19 may be radial. Case 7 has an opening 21 through which the tape is inserted when the tape is being wound and through with an entire length of the tape can pass when the tape is being unwound because the tape is free of connections.

FIG. 3A shows the positions of rollers 17 as the tape is first being wound with rollers first 17 urged inward by flexible tension device 111 and FIG. 3B shows the position of rollers 17 after the tape has been wound with first rollers 17 moved outward in slots 19 to accommodate the increase in diameter. FIG. 3C shows an end view with flexible tensions device 11 on axles of first rollers 17. Alternatively, a groove in first rollers 17 or other suitable mechanism may be provided to hold flexible tension device 11 in place.

The tape 9, with its arcuate cross section and straight length, will not form a coil unless urged and should be pressed flat to coil properly. To facilitate winding the tape on core 3, a second roller 23 may be provided in a fixed position inside case 7 near opening 21. Second roller 23 helps flatten the tape as is inserted into opening 21 to make winding easier. A third roller 25 may also be provided that is also fixed in position inside case 7 nearer to opening 21 and farther from core 3 than second roller 23 to begin flattening the tape when it is inserted into opening 21. Rollers 23 and 25 should be spaced from core 3 a distance sufficient to accommodate the entire coiled tape 9 (in order not to interfere with operation of first rollers 17 and flexible tension device 11.)

In operation, roller 25 forms a nip that begins to flatten the curved cross section of the tape as a free end of the tape is pushed into the case. Roller 23 further flattens the tape to start the coil. Several of these fixed rollers may be used in series to start the coil. Rollers 23 and 25 need not be in contact with core 3 as the tape enters.

Figure 4A:
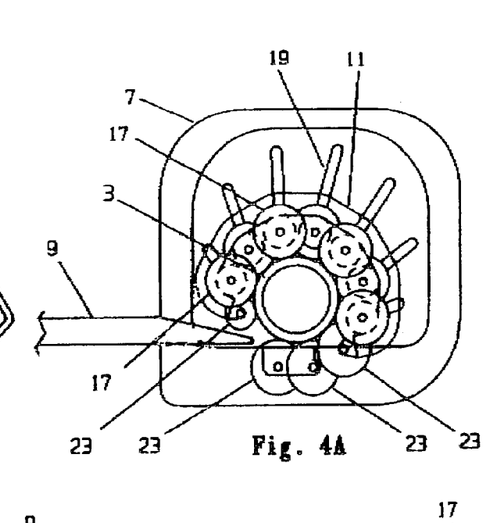
FIGS. 4A-E are views of a third embodiment of the present invention.
Figure 4B:
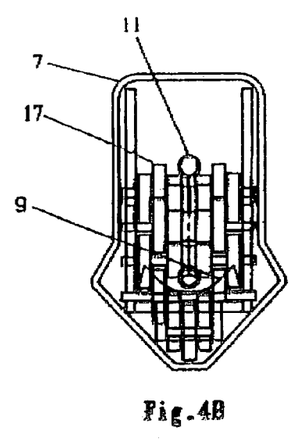
Figure 4C:
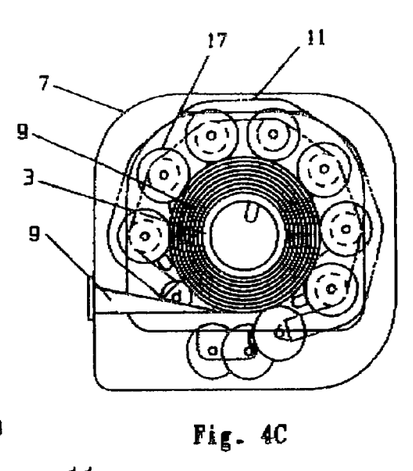
Figures 4D, 4E:
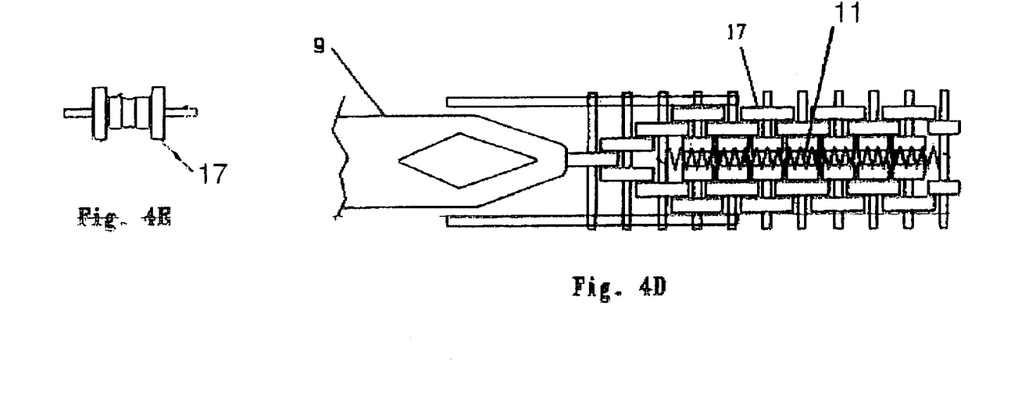

FIGS. 4A-E show a further embodiment that also uses rollers that are movable in slots. As shown in FIG. 4A and as with the previous embodiment, a flexible tension device 11 provides the radially inward force that urges first rollers 17 against an external periphery of coiled tape 9. First rollers 17 can move in slots 19 and second roller 23 is on a fixed center. FIG. 4B is an end view and shows a tiltable case (discussed below). FIG. 4C is similar to FIG. 4A but shows all the tape coiled in the case. The first rollers have moved out as needed. FIG. 4D is a partial view of the series of first rollers 17 "unwound" for clarity. The overlap of the rollers is clear. The overlap helps contain the end of the tape as it is pushed into the case. The tape 9 must be forced to coil and the close spacing of the first rollers in this embodiment does this with little friction. FIG. 4E is a detail of one of the moving roller assemblies. First rollers 17 may include several parts, with larger diameter side parts contacting the tape and a smaller diameter center part with a groove in which flexible tension device is located. The axle ends shown at the opposite sides of first roller 17 in FIG. 4E are free to move in slots 19.

In addition, embodiments of the present invention may include some type of conventional brake on the tape, such as a clamp. Alternatively, friction may be selectively applied to one or more of the rollers, or a movable slide may be provided that is pushed inward from an exterior of the case and presses against the coiled tape and increases the tape-to-tape friction.

Figure 5A:
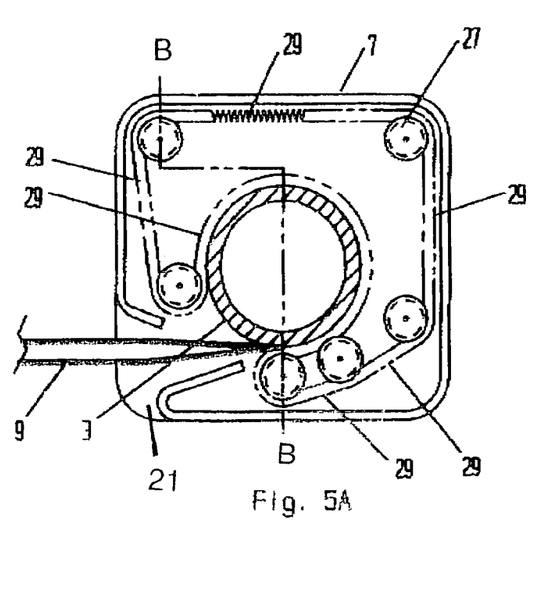
FIGS. 5A-C are views of a further embodiment of the present invention.
Figure 5B:
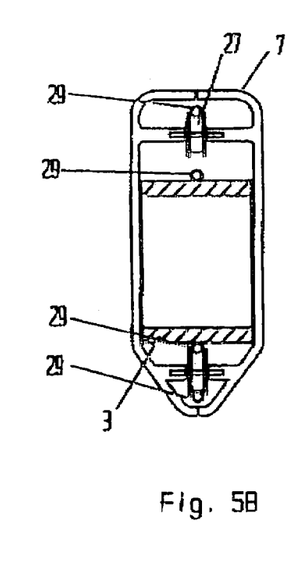
Figure 5C:
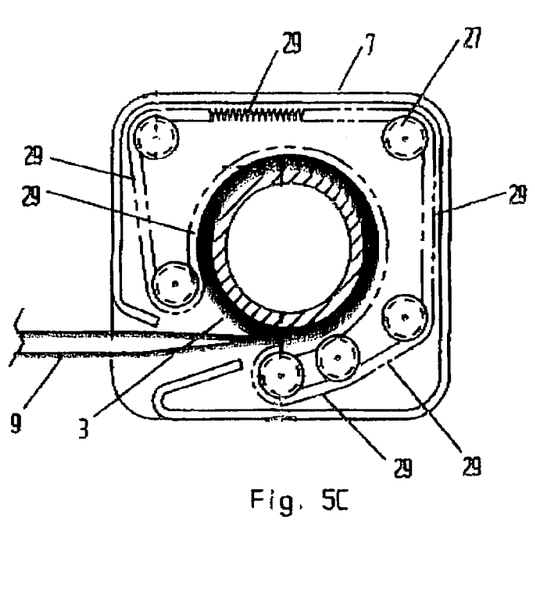

FIGS. 5A-5C show views of a further embodiment with fewer parts. Rollers 27 are fixed in position inside the case spaced from the external periphery of tape 9. Rollers 27 carry a loop 29 that is an endless type of the flexible tension device mentioned above. Loop 29 also urges most of the external periphery of the coiled spring radially inward, as with the previous embodiments. The tape is pushed into the bite of the core and loop 29, the loop being free to move with the tape so there is little wear or friction. The loop 29 goes around the core 3 and rollers 27. Core 3 may be movable within case 7 to accommodate larger tapes, as shown by the displaced position of core 3 in FIG. 5C. As the coil of tape 9 increases in diameter, core 3 moves up and to the right in FIG. 5C relative to the position in FIG. 5A. Core 3 may move freely in this manner or may have axles that slide in grooves provided for this purpose. This design may be especially preferred for longer tapes because elongation of the flexible tension device, as a percentage of its minimum working length, is less than in other embodiments. Thus, a larger coil of tape can be stored in the case without the spring force increasing so much that the friction is too high.

Figure 6A:
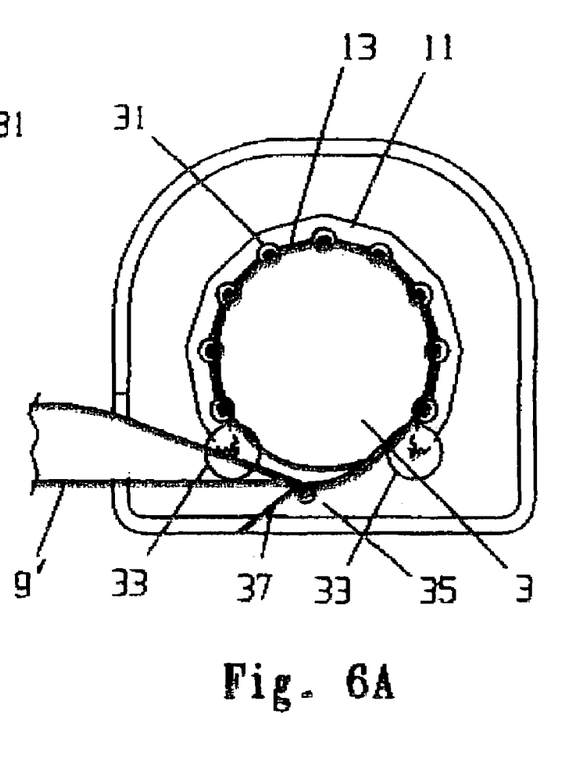
FIGS. 6A-C are views of yet a further embodiment of the present invention.
Figure 6B:
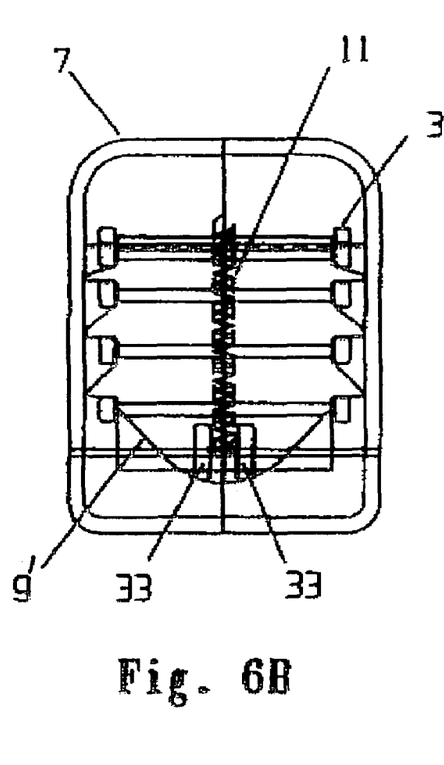
Figure 6C:
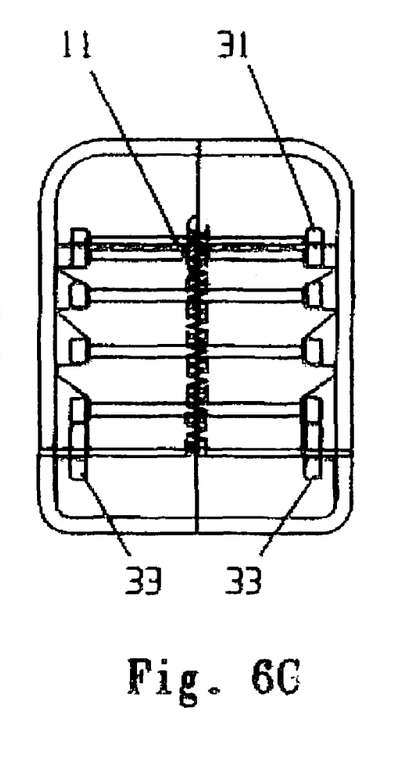

FIGS. 6A-C show an embodiment adapted to receive a wider and thicker tape and that includes rollers 31 and low friction strip 13 (as in FIG. 2). FIG. 6A is a side view of a wide tape 9' entering a case and being coiled around a core by low friction strip 13. Rollers 31 are supported and positioned by the strip and the strip and rollers are pressed inward by flexible tension device 11. At least two fixed rollers 33 may be provided as discussed above. Low friction strip 13 may be anchored at post 35 and may include a ramp 37 to help guide the tape into the bite.

Figure 7:
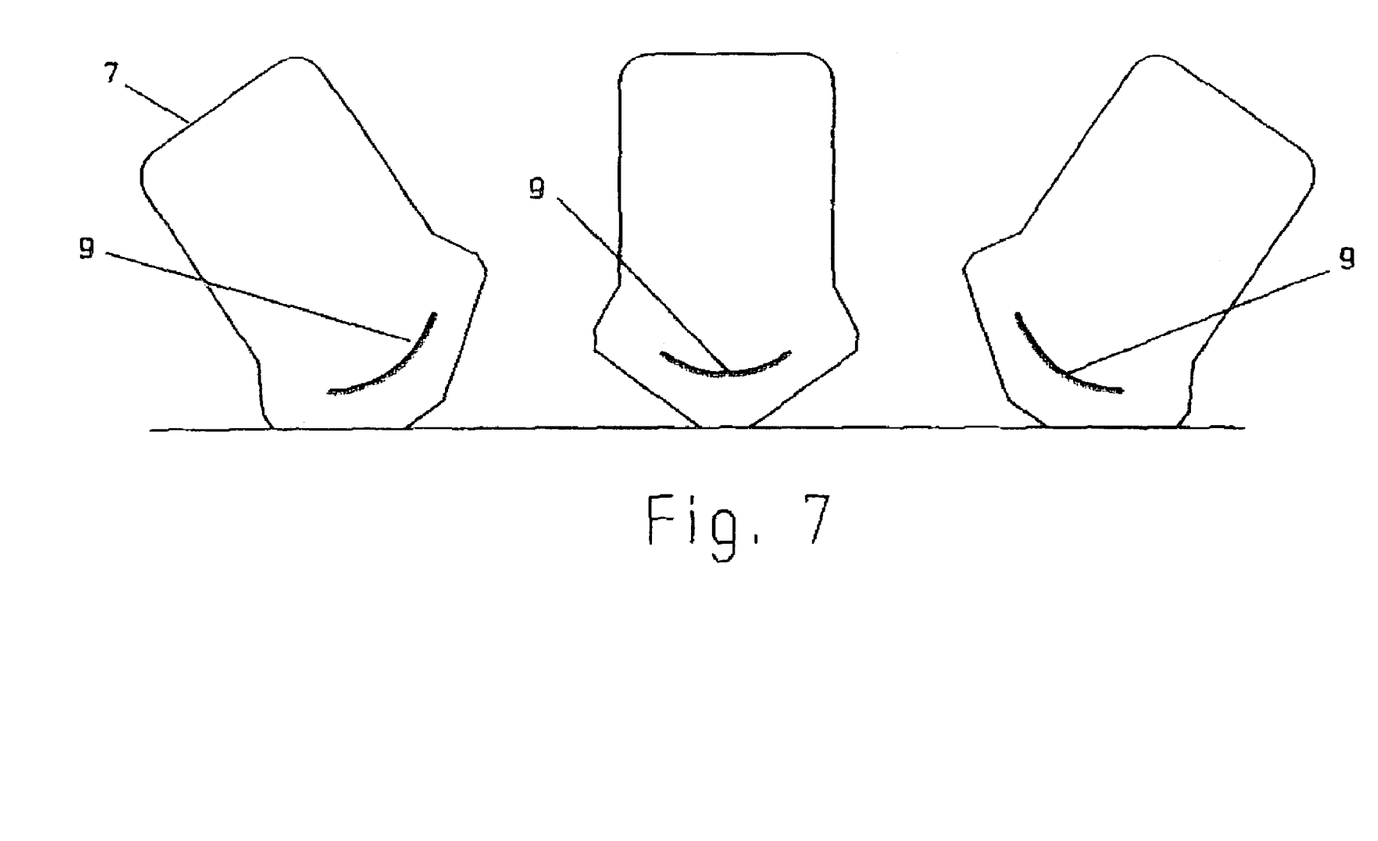
FIG. 7 depicts end views of a case of the present invention tilted left, sitting upright, and tilted right.

FIG. 7 shows end views of case 7 with some length of the tape coming toward the viewer. Case 7 is shown in three positions, tilted left, upright, and tilted right. The tilted case gets the edge of the tape closer to the work surface for easier and more accurate measurements. Some distance from the case the edge of the tape is on the work surface.

The tape of the present invention is a free tape, which is unattached to any other part of the tape measure. It may be completely removed from the case and used as a measuring device or straight edge without the encumbrance of the case. Different tape lengths and thicknesses can be supplied and interchanged by the user as it is easy to put the tape in the case. Popular lengths may be 6', 7½' (90"), 8', 100", and 10'. There may be metric and dual-marked tapes. The free tape is light and easy to use and slide around the work surface. Suitable graduations may be provided on either or both sides of the tape. When the tape is free, it may be used with the concave side down and graduations on the convex side can rest directly on the work. This allows easy and accurate measurement.

Figure 8A:
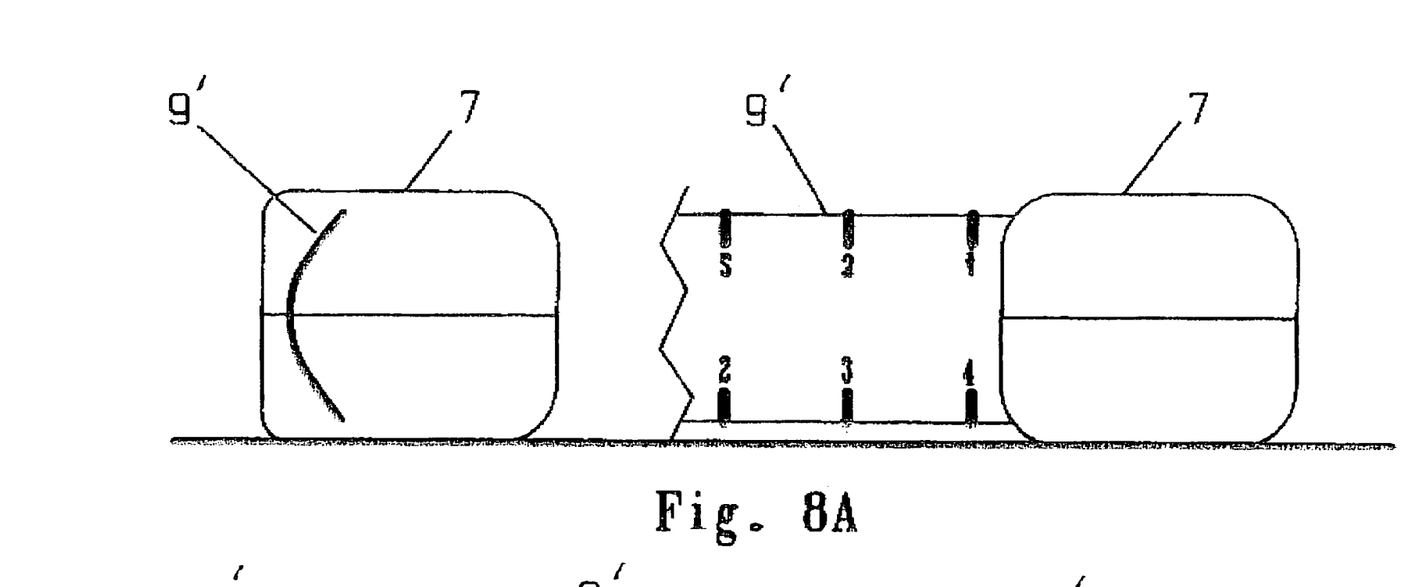
FIGS. 8A-C are views of a wide tape showing an advantageous tape viewing angle afforded by the free tape of the present invention.
Figure 8B:
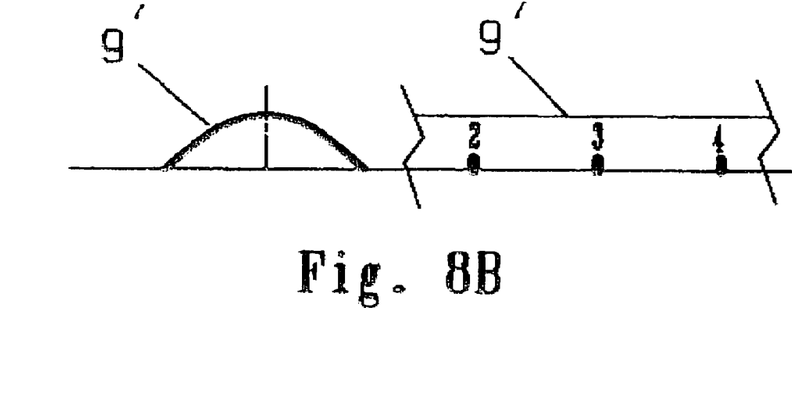
Figure 8C:
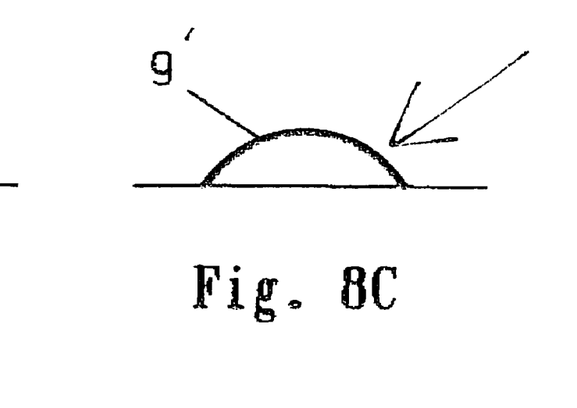

FIG. 8A shows wide tape 9', partly in the case, with the case on its side on the work surface. FIG. 8B has the tape free of the case and with the edges on the work. The tape cross section is typical of 1.25" wide tapes used today with the center section formed to a radius of about 0.5" and the edges not formed. FIG. 8C is a cross section with all of the tape formed, but to a larger radius. The thickness of the steel used to make the tape can be greater with a larger radius. The easier viewing of the graduations is shown by the viewing angle indicated by the arrow in the drawings.

The wide tape may be 1½ inches or more wide and with its deep curve is easily viewed from normal angles when the case is on its side, rather than tilted as shown in FIG. 7. This extra wide tape can be of a normal thickness, about 0.005", and with a radius of curve in the center portion of about 0.5". The edges of the tape may be straight, as shown, or may be curved. The amount of curve that a steel tape can have is dependant on the tape thickness. FIG. 8C shows a cross section with a radius of curve of 0.75" and this allows a thicker tape material by about 50%. Thus the thickness may go from 0.0050 to 0.0075" and this has a big impact on the stiffness of the tape. It will be over three times stiffer. Stand out should be much better and this is a major and important improvement. The use of extra wide and thicker tape is the result of the free tape feature of this invention. Even wider tapes will be welcome by many users. Tape widths in the 2-3" range will allow reverse graduations (zero at each end of the tape) and provide space for other information needed by many trades. A carpenter may wish data on roof slopes, as an example. Carpenters may want some data, plumbers other data and people working with fabric yet other. Excellent stiffness will make a better straight edge and a stiffer measuring rod.

Figure 9A:
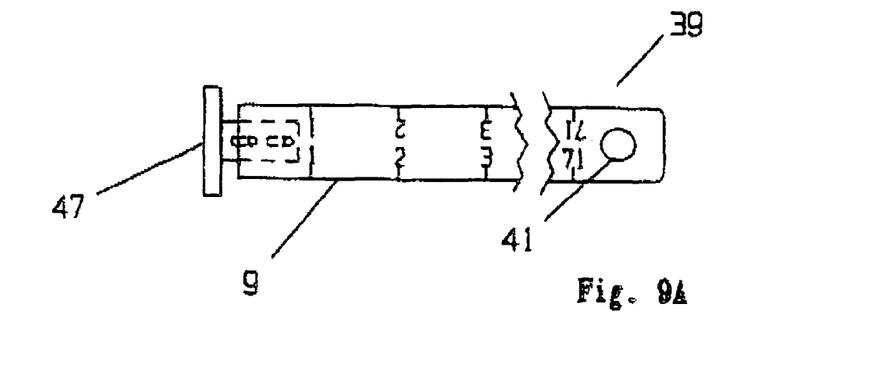
FIGS. 9A-C show various embodiments for the radially interior end of the tape of the present invention.
Figure 9B:
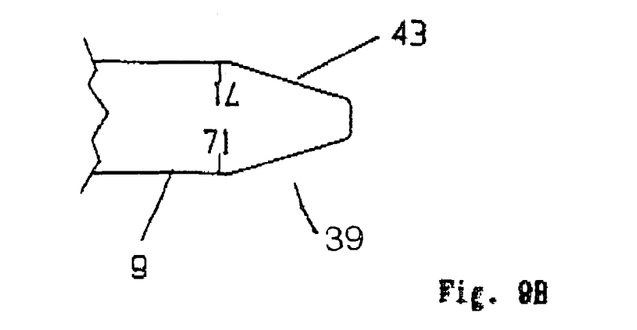
Figure 9C:
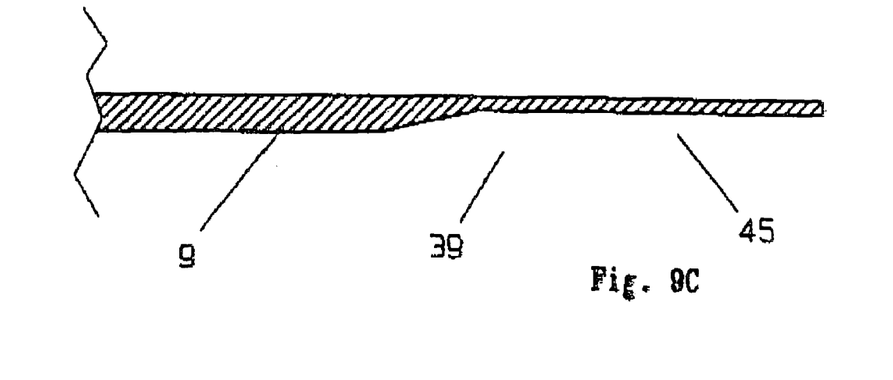

In a preferred embodiment, a transition of the tape from its straight, curved section to the coiled, flat cross section is facilitated by removing some material from the insertion end of the tape as shown in FIGS. 9A-C. That is, a radially interior distal part 39 of tape 9 has a lower amount of tape material per unit length than a remaining part of the tape. This may be accomplished by providing a hole 41 as shown in FIG. 9A, by making this part of the tape V-shaped 43 as shown in FIG. 9B, by making the radially interior distal part of the tape thinner 45 (e.g., reducing a thickness of the metal) than a remaining part of tape as shown in FIG. 9C, or in other suitable ways. Removing material, as with the hole, V-shape or thinning, near the end will make it easier for the end of the tape to be flattened and for the coiling to start.

Figure 10A:
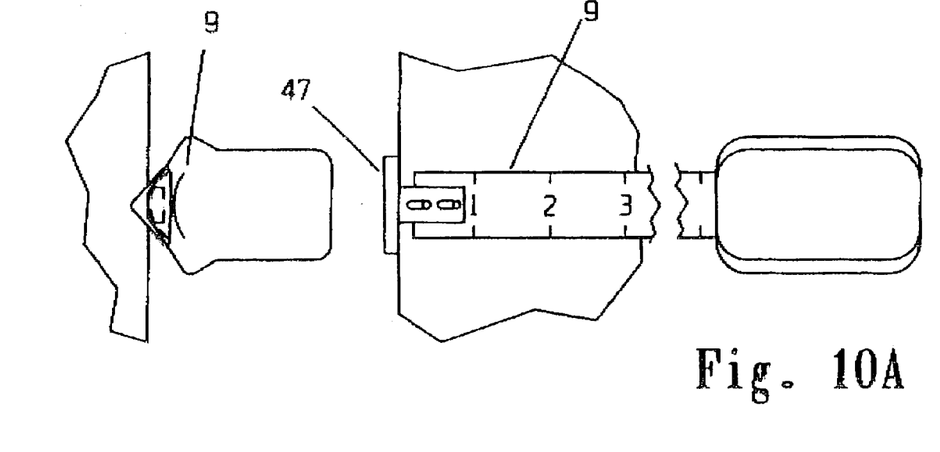
FIGS. 10A-B show an exterior end of the tape of the present invention.
Figure 10B:
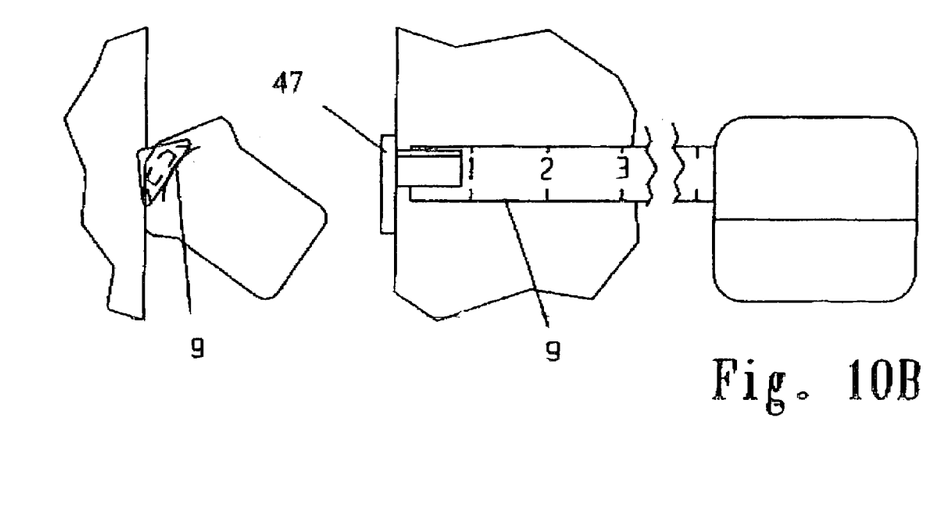

FIGS. 10A-B show ends of the tape with the convex side up. A hook 47 may be provided at the end of the tape which is normally outside the case and may be shaped to be useful with the tape either side up. It is shaped so a tilted tape has the graduations near the work. As with conventional tape measures, the thickness of hook 47 is compensated for by play in its connection to the tape. This allows both inside and outside measurements to be made accurately.

Figure 11A:
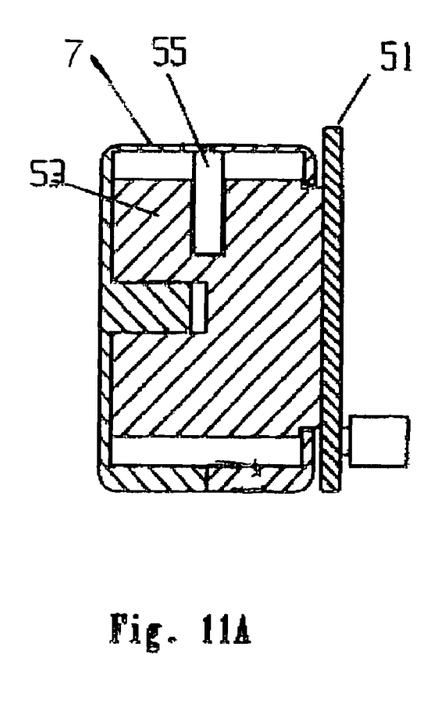
FIGS. 11A-C show a handle assembly for winding the tape of the present invention.
Figures 11B, 11C:
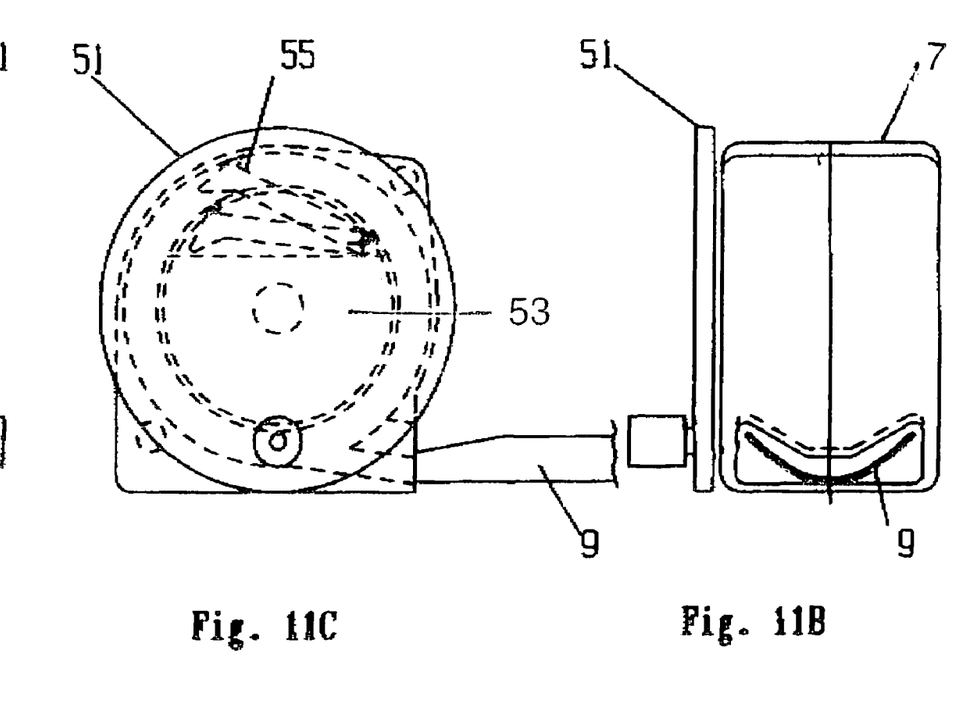

A further embodiment includes a handle for winding the tape on the core. As shown in FIGS. 11A-C, this embodiment may include a rotatable handle 51 on an exterior of the case, a rotatable hub 53 inside the case that is rotated by handle 51 and around which the tape is coiled, and a latching device 55 attached to hub 53. The latching device rotates with the hub and engages an interior part of the tape to cause the tape to wind around the hub when the handle is rotated. The latching device may be a hook engaging a hole in the tape, or may be another selectively releasable mechanism (e.g., matching hook and loop fabric). The case may be of conventional design with two molded plastic parts held together by screws. Inside the case, hub 53 is connected to handle 51 by welding or screws, not shown. Hub 53 fits on a post which is part of the case and is free to turn within the case. The latching device 55 may fit into a cavity in the hub and be spring loaded outward and able to touch the inner surface of the case. The latching device can be depressed below the outer surface of the hub. The tape has a corresponding feature to engage the latching device (e.g., hole to engage a hook). When the end of the tape is inserted at least an inch or so and the handle is turned, the hook engages the hole and winds the tape into the case.

The case is preferably made of Teflon®, Delrin®, or polyethylene, or an alloy or mixture containing these or other low friction materials to allow the tape to extend normally. Plastics with higher friction, such as ABS or PVC may hold the tape into the case and prevent reliable self-extension. Low friction material can be added to the inside of the case as an alternate production method. Common types of locks can be incorporated into the design to hold the tape in place. Even without such positive locks the tape can be wound so about six inches of the tape is still out of the case and then the tape pushed into the case. These last few inches of tape will expand the coil to the inside of the case, locking it in place by friction.

The present invention offers several improvements over the known art. One of the significant improvements is that the tape can be completely removed from the case (a free tape) and thereby offer a useful alternative to tape measures that do no have a free tape. The free tape herein can have graduations on both sides and be used with either the convex or concave side up. With the convex side up, the graduations can be placed directly adjacent to the workpiece so that measurements can be made more accurately. The free tape herein also allows a wider tape to be used which will be stiffer so as to provide a greater "stand-out" and more room for scales and useful information.

When the tape is used when still connected to the case, as it will be for many short measurements, the case is designed to tilt so the tape is at a good reading angle and the graduations are on of close to the work. The case and tape can tilt either way so that the "zero" end of the tape can be at the right or left.

The new design is about half the weight and cost of similar tapes now on the market. No return spring is needed. Most tapes will be used indoors and the tape lengths will generally be in the range of six to twelve feet, again saving weight and cost.

One product design using the new technology allows the case and tape to be tilted either way to present the tape so readings can be made from either side. Short distances may be measured with the tape pulled out only a foot or so. Longer measurements are easier with the tape free of the case. Either way the graduations are at an easy reading angle and the accuracy is better as the graduations are on the work. The manual pushing of the tape edge to the work surface to get a good reading is not required, as it is with tape measured now on the market. This extra operation is especially bothersome when one hand holds a pencil and the other a drawing or a drill.

The tape can come free and be easily pushed or wound back in, with some designs requiring the user to pull out the tape, either partially or fully, and then push it back into the case. Other designs, made with less internal friction, feature a self-extending tape. Moving a button will extend the tape either partially or fully. The user will need to push the tape back into the case. Another product design using this new technology has a crank on the side of the case to wind in a tape that has been inserted a few inches by hand.

While embodiments of the present invention have been described in the foregoing specification and drawings, it is to be understood that the present invention is defined by the following claims when read in light of the specification and drawings.

I claim:

1. A tape measure, comprising:
   a case;
   a resiliently deformable coiled tape inside said case that is free of connections to said case;

a flexible tension device that is attached to said case and that extends around and imparts a radially inward force to a majority of a radially external periphery of said coiled tape;

plural spaced apart first rollers that roll on the external periphery of said coiled tape and that are urged radially inward by said flexible tension device; and plural slots inside said case and in which respective axes of said first rollers are displaced in response to a change in diameter of the external periphery of said coiled tape.

2. The tape measure of claim 1, further comprising a low friction strip between said flexible tension device and the external periphery of said coiled tape.

3. The tape measure of claim 1, wherein each of said first rollers comprises a first part with a groove that receives said flexible tension device and a second part that rides on the external periphery of said coiled tape.

4. The tape measure of claim 1, wherein said case has an opening through which an end of said coiled tape emerges, and further comprising a second roller that is fixed in position inside said case near said opening.

5. The tape measure of claim 4, further comprising a third roller that is fixed in position inside said case nearer to said opening than said second roller.

6. The tape measure of claim 1, wherein said flexible tension device comprises a spring that extends around and imparts the radially inward force to at least two-thirds of the external periphery of said coiled tape.

7. The tape measure of claim 6, wherein said spring extends around and imparts the radially inward force to at least three-quarters of the external periphery of said coiled tape.

8. The tape measure of claim 1, wherein said flexible tension device comprises an elastic non-metallic material.

9. The tape measure of claim 1, wherein said coiled tape is a graduated metal ribbon with an arcuate cross section.

10. The tape measure of claim 1, wherein said coiled tape is graduated on two opposite surfaces.

11. The tape measure of claim 1, wherein a radially interior distal part of said coiled tape has a lower amount of tape material per unit length than a remaining part of said coiled tape.

12. The tape measure of claim 11, wherein the radially interior distal part of said coiled tape is V-shaped.

13. The tape measure of claim 11, wherein the radially interior distal part of said coiled tape is thinner than a remaining part of said coiled tape.

14. A tape measure, comprising:
a case;
a resiliently deformable coiled tape inside said case that is free of connections to said case;
a flexible tension device that is attached to said case and that extends around and imparts a radially inward force to a majority of a radially external periphery of said coiled tape; and
a rotatable handle on an exterior of said case, a rotatable hub inside said case that is rotated by said handle and around which said coiled tape is coiled, and a latching device attached to said hub,
wherein said latching device engages said coiled tape to cause said coiled tape to wind around said hub when said handle is rotated.

15. The tape measure of claim 14, wherein said coiled tape is graduated on two opposite surfaces.

16. A tape measure, comprising:
a case having an opening;
a core inside said case;
a spring extending around and imparting a radially inward force to at least two-thirds of a circumference of said core;
a graduated metal tape having an arcuate cross-section and being wound around said core between said core and said spring, said metal tape having a first end directly adjacent to said core and a second end exposed at said opening, said spring urging said metal tape against the circumference of said core, said metal tape being free of connections to said case and having an entire length that passes through said opening;
plural spaced apart first rollers that roll on an external periphery of said tape wound around said core and that are urged radially inward by said spring;
plural slots inside said case and in which respective axes of said first rollers are displaced in response to a change of diameter of the external periphery of said metal tape wound around said core; and
a second roller that is fixed in position inside said case near said opening.

17. The tape measure of claim 16, wherein said metal tape is graduated on two opposite surfaces.

18. A tape measure, comprising:
a case;
a resiliently deformable coiled tape inside said case that is free of connections to said case;
a flexible tension device that is attached to said case and that extends around and imparts a radially inward force to a majority of a radially external periphery of said coiled tape; and
plural spaced apart rollers between said coiled tape and said flexible tension device and that are urged radially inward by said flexible tension device, said plural spaced apart rollers being free of attachment to said flexible tension device and rolling on the external periphery of said coiled tape.

19. The tape measure of claim 18, further comprising means for supporting and positioning said rollers.

20. The tape measure of claim 19, wherein said means comprises a flexible strip.

21. The tape measure of claim 18, wherein said coiled tape is graduated on two opposite surfaces.

* * * * *